G. DE GRAHL.
APPARATUS FOR CONSUMING SMOKE IN LOCOMOTIVE FURNACES.
APPLICATION FILED JULY 22, 1912.
1,095,629.
Patented May 5, 1914.
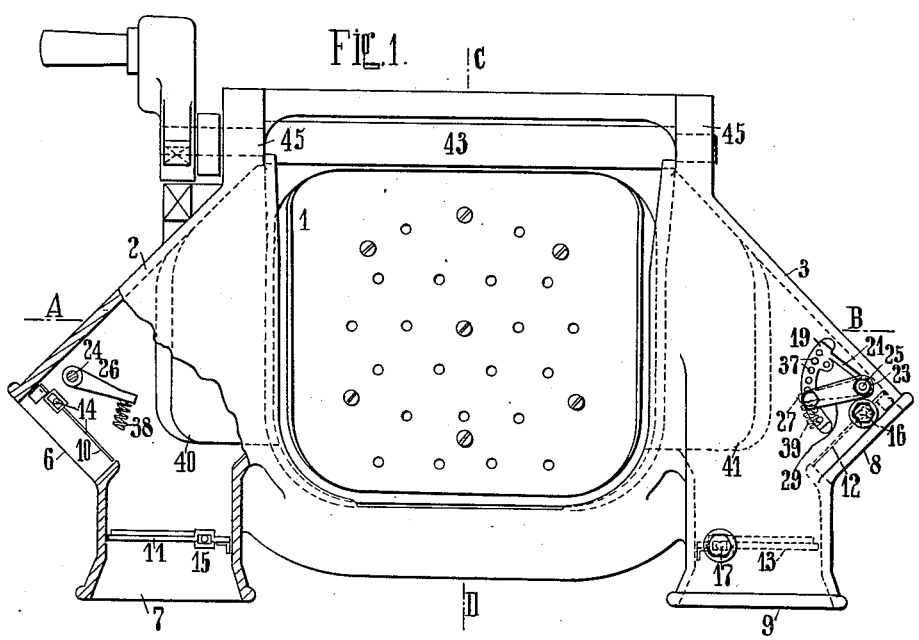
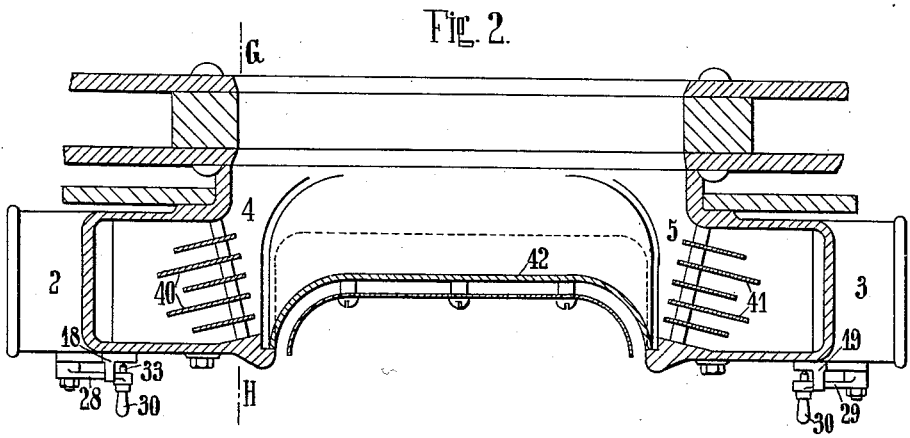

G. DE GRAHL.
APPARATUS FOR CONSUMING SMOKE IN LOCOMOTIVE FURNACES.
APPLICATION FILED JULY 22, 1912.
1,095,629.
Patented May 5, 1914.
6 SHEETS—SHEET 2.
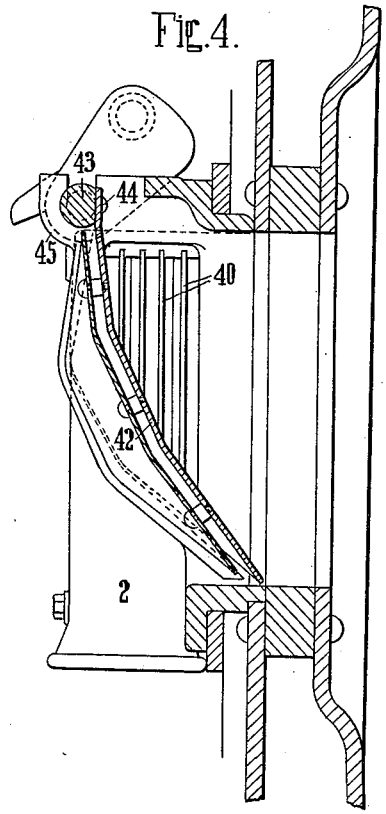
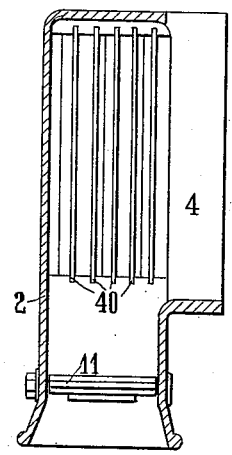

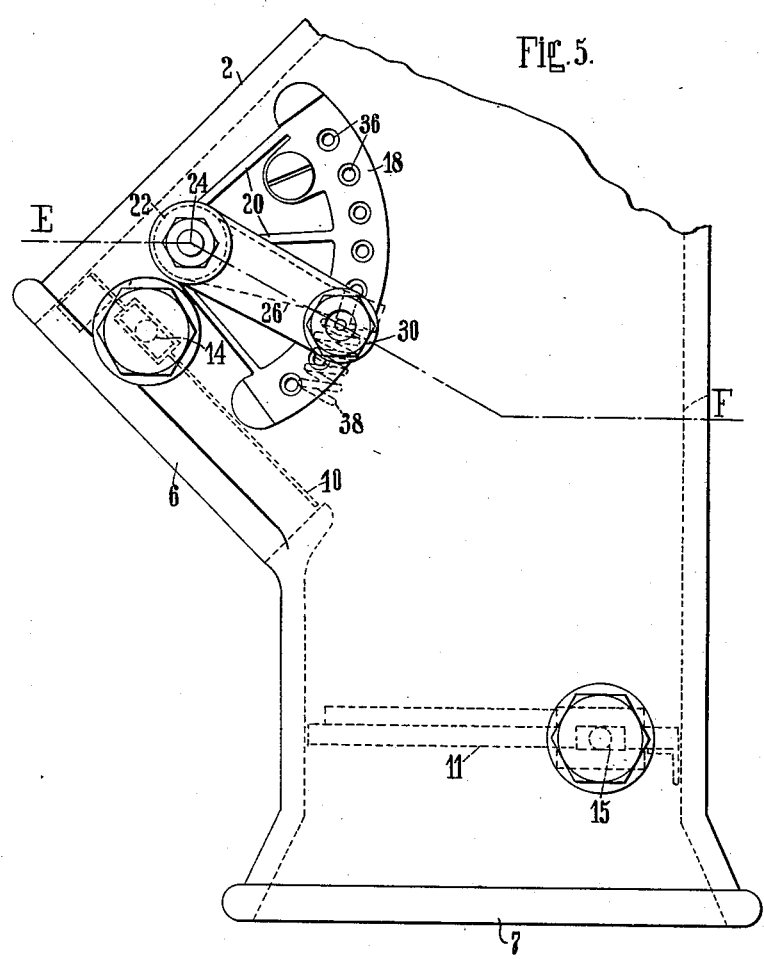

G. DE GRAHL.
APPARATUS FOR CONSUMING SMOKE IN LOCOMOTIVE FURNACES.
APPLICATION FILED JULY 22, 1912.

1,095,629.

Patented May 5, 1914.

6 SHEETS—SHEET 4.

G. DE GRAHL.
APPARATUS FOR CONSUMING SMOKE IN LOCOMOTIVE FURNACES.
APPLICATION FILED JULY 22, 1912.
1,095,629.
Patented May 5, 1914.
6 SHEETS—SHEET 5.
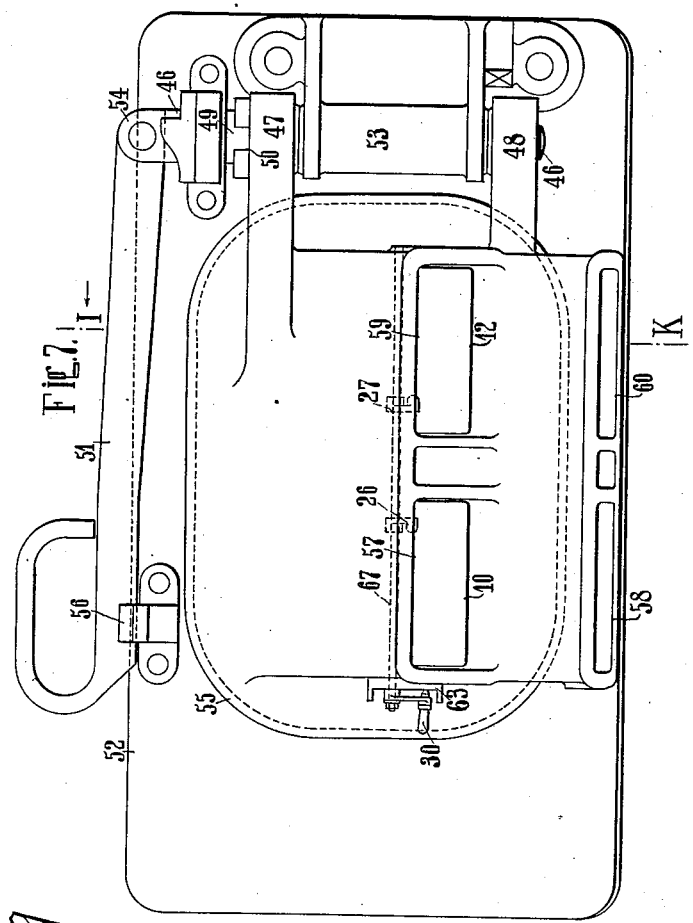
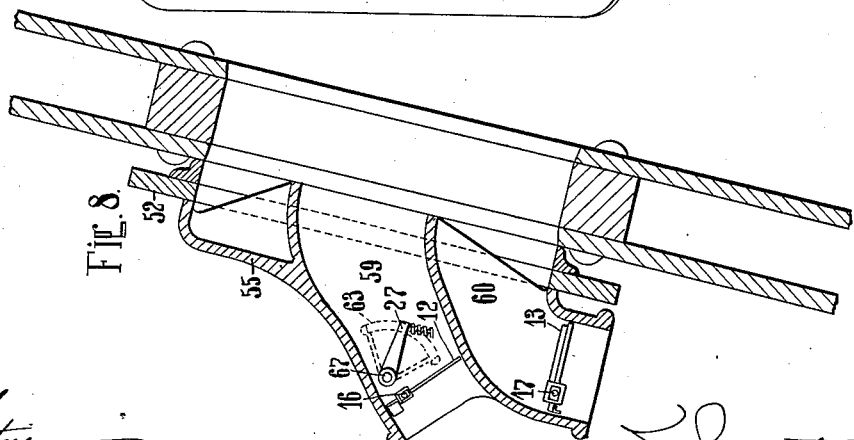

G. DE GRAHL.
APPARATUS FOR CONSUMING SMOKE IN LOCOMOTIVE FURNACES.
APPLICATION FILED JULY 22, 1912.

1,095,629.

Patented May 5, 1914.
6 SHEETS—SHEET 6.

UNITED STATES PATENT OFFICE.

GUSTAV DE GRAHL, OF ZEHLENDORF, NEAR BERLIN, GERMANY.

APPARATUS FOR CONSUMING SMOKE IN LOCOMOTIVE-FURNACES.

1,095,629.        Specification of Letters Patent.        Patented May 5, 1914.

Application filed July 22, 1912. Serial No. 710,971.

*To all whom it may concern:*

Be it known that I, GUSTAV DE GRAHL, a citizen of the Empire of Germany, and residing at Zehlendorf, near Berlin, Germany, have invented a certain new and useful Improved Apparatus for Consuming Smoke in Locomotive-Furnaces, of which the following is a specification.

My invention relates to apparatus for consuming smoke in locomotive furnaces, and a primary object is to provide that the admission of secondary air to the furnace is controlled by two pairs of non-return valves, of which one pair opens when the vacuum in the furnace is comparatively low, and the other when this vacuum is increased.

One advantage I obtain is that the supply of secondary air to the furnace is always regulated according to the requirement of air therein, so that always only the amount of air exactly necessary for the consumption of smoke is admitted to the furnace, and consequently, on the one hand, the furnace gases are not undesirably cooled by a too plentiful admission of air and, on the other hand, incomplete combustion due to insufficient air is prevented.

I will now more clearly explain my improved process described above in outline with reference to apparatus for carrying out the same as illustrated by way of example in the accompanying drawings, wherein:—

Figure 6:
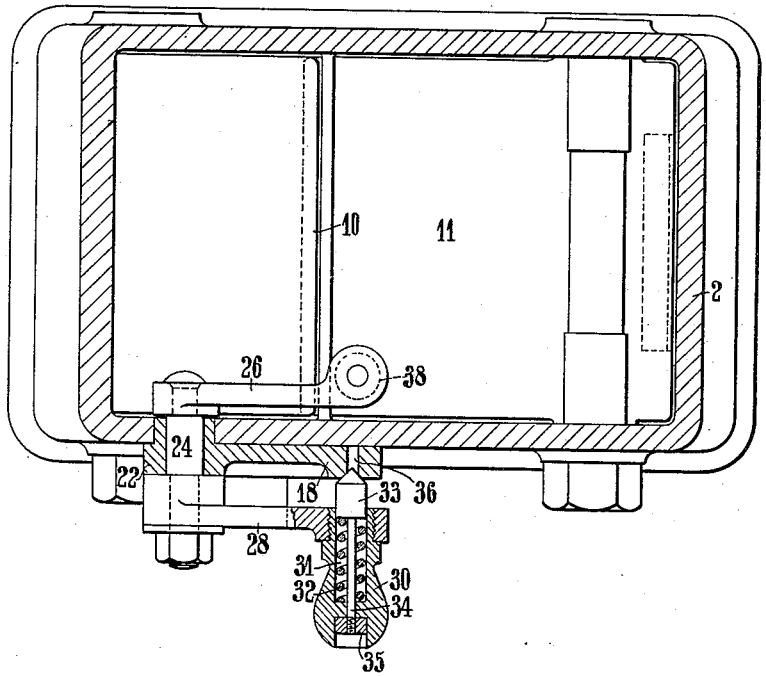
Figure 9:
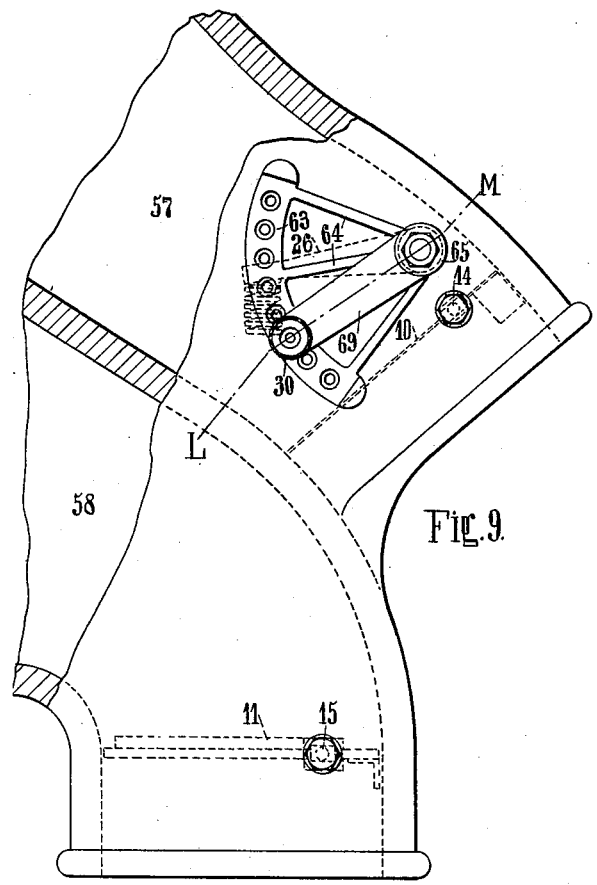
Figure 10:
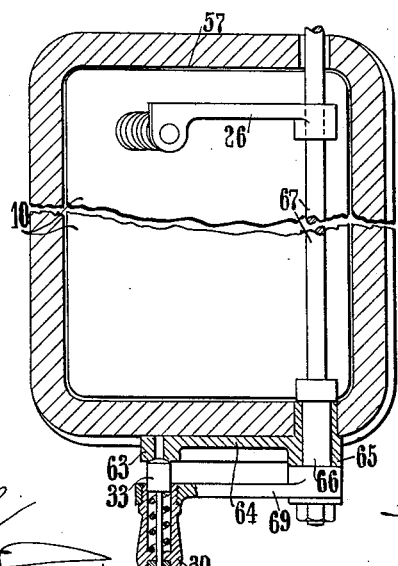

Figures 1 to 6 show one form of my apparatus, Fig. 1 being an elevation, partly in section, showing the door-frame and the flap-valves opening toward the furnace, Fig. 2 a horizontal section taken on the line A—B in Fig. 1, Fig. 3 a vertical section, enlarged, through one of the two side passages, taken on the line G—H in Fig. 2, Fig. 4 a section through the fire-door, taken on the line C—D in Fig. 1, Fig. 5 an elevation, enlarged, showing the device for limiting the movement of the upper valves, and Fig. 6 a section taken on the line E—F in Fig. 5; Figs. 7–10 show a second form of my apparatus, Fig. 7 being a front elevation, Fig. 8 a vertical section taken on the line I—K in Fig. 7, Fig. 9 a side elevation, enlarged, partly in section, showing the valve adjustment device, and Fig. 10 a section taken on the line L—M in Fig. 9.

Referring firstly to Figs. 1 to 6, the numeral 1 designates the door-frame provided on both sides with chambers 2, 3 which open into the furnace at 4 and 5 respectively (Fig. 2). The lower portion of each chamber 2, 3 contains two openings 6, 7 and 8, 9, respectively, for the admission of secondary air to the furnace. For closing these openings I provide two pairs of non-return or flap valves 10, 12 and 11, 13, rotatable about pivots 14, 16 and 15, 17 respectively. The valves 10, 12 are so light or so counterbalanced that they are opened when the action of the draft is very small, as for example, when traveling downhill or when the locomotive is stationary. The valves 11, 13 on the other hand have such a weight or are so loaded that they open only when, after starting the engine and consequently the main draft, a sufficiently high vacuum has been produced in the furnace.

On the wall of each of the lateral air-conduits is fastened a segment 18 (Fig. 5) and 19 (Fig. 1) respectively connected by ribs 20 and 21 with a bush 22 and 23. These bushes extend through the walls of the chambers 2 and 3 above the valves 10 and 12, respectively, and each carries rotatable pins 24 and 25, respectively. Fast on one end of each of these pins is a lever 26 and 27, respectively, for stopping the valves 10, 12, and on the other end a lever 28 and 29, respectively, for rotating the pin by hand. Fast on each lever 28, 29 is a handle 30 having a bore 31 therein. The spring 32 in this bore 31 presses against the head 33 of the pin 34. The latter slides in the handle 30 and carries a nut 35. The segments 18 and 19 have rows of holes 36 and 37, respectively, widened to receive the tapered end of this head 33. The levers 26, 27 are each suitably provided with a spiral spring 38, 39 respectively which form stops for the valves 10 and 12. When the head 33 enters into the lowest of the holes 36 or 37, the lever 26 or 27 is in its lowest position. The valves 10 or 12 are then allowed to open scarcely at all.

The chambers 2, 3 contain grid-like ribs 40 or 41. As seen in Fig. 2, these ribs slant relatively to the front of the boiler, so that the air is guided in a manner favoring its admission to the furnace. The ribs 40, 41, which can be exchanged if desired, prevent clinker and particles of coal getting into the chambers 2, 3 and at the same time well heat the air admitted through the air-conduits into the furnace.

The hinged door 42 opens toward the furnace, and is fastened on the axle 43 in suitable manner e. g. by rivets 44, the axle being journaled in forwardly projecting brackets 45 of the door frame.

The above described apparatus operates as follows:—When the engine is stationary, i. e. when the auxiliary blast alone is operating, only the pair of valves 10, 12 rise to their open positions, secondary air being admitted solely by way of these to the furnace. Not till after the engine is started and the main draft is in action, and after the pair of valves 10, 12 has completely opened will the other pair 11, 13 of valves be opened according to the extent of the vacuum in the furnace, air being thus admitted through these valves also to the furnace.

The embodiment illustrated in Figs. 7–10 differs from the previous one chiefly in that the air-conduits are arranged not in the door-frame, but in a door rotatable about a vertical axis. Referring to these figures, the plate 52 is fast on the outer wall of the fire-box and carries the bracket 53 in which is journaled the vertical pivot-pin 46 fastened to the two lugs 47, 48 of the door. The rotation of the door with the pin 46 is insured owing to the collar 49 fast on this pin having a projection 50 which engages in a corresponding notch in the lug 47. To the forked head 54 of the pin 46 is pivotally connected the lever 51 which, when the door is closed, engages in the bracket 56. The fire-door 55 is provided with air-conduits, each two of which 57, 58 and 59, 60 are arranged one over the other. In each of the upper conduits 57, 59, a non-return valve 10, 12 respectively is hinged on a pin 14, 16, respectively, and in each of the lower conduits 58, 60 a non-return valve 11, 13, respectively, on a pin 15, 17, respectively. As in the embodiment illustrated in Figs. 1 to 6 the valves 10, 12 are made so light that they rise when the action of the draft is very small, while on the other hand the valves 11, 13, owing to their greater weight, do not open till the vacuum in the furnace has risen to a predetermined value.

On the side wall of the air-conduit 57 is fastened a segment 63 connected by ribs 64 with a bush 65. The latter extends through the side wall above the valve 10 (Fig. 7), and receives the end 66 of the rod 67. On the latter are fastened the two levers 26, 27 forming the stops for the valves 10, 12. On the end 66 is fastened the lever 69 terminating in the handle 30. The latter is arranged as shown in Figs. 1 to 6, and owing to a spring inside the handle the head 33 enters into the recesses or holes in the curved segment 63.

The action of the pairs of valves 10, 12 and 11, 13 when starting the auxiliary blast and main draft is the same as in the embodiment according to Figs. 1 to 6, i. e. when the auxiliary blast causes a very small draft air is admitted to the furnace by way of the valves 10, 12, whereas when the main draft is operating air enters also through the other valves 11, 12, the admission of air depending on the extent of the vacuum in the furnace.

I claim:—

1. Apparatus for consuming smoke in locomotive boiler furnaces, comprising in combination, a furnace front having a fire door, a plurality of pairs of conduits one above the other and opening into the furnace with their upper ends, an automatic non-return valve in each conduit and means for regulating the maximum amount of said valves in each upper conduit, substantially as described.

2. Apparatus for consuming smoke in locomotive boiler furnaces, comprising in combination a furnace front having a fire door, a plurality of pairs of conduits one above another and opening into the furnace with their upper ends, a heavily weighted automatic non-return valve in each lower conduit, and a lightly weighted automatic non-return valve in each upper conduit, and means for regulating the maximum amount of said valves in each upper conduit can open.

3. Apparatus for consuming smoke in locomotive boiler furnaces, comprising in combination a furnace front having a fire door, a plurality of pairs of conduits one above another and opening into the furnace with their upper ends, a lightly weighted automatic non-return valve in each upper conduit, a stop lever journaled in each upper conduit above the valve thereof, a spiral spring fast on said lever and constituting a stop for the valve, means for setting each lever in any desired position, and a heavily weighted automatic non-return valve in each lower conduit.

In testimony whereof, I affix my signature in the presence of two witnesses.

GUSTAV de GRAHL.

Witnesses:
 HENRY HASPER,
 WOLDEMAR HAUPT.